United States Patent
Wright

(10) Patent No.: US 6,708,116 B2
(45) Date of Patent: Mar. 16, 2004

(54) METHOD AND APPARATUS FOR ORBIT DETERMINATION

(75) Inventor: James Wright, Morgantown, PA (US)

(73) Assignee: Analytical Graphics, Inc., Malvern, PA (US)

( * ) Notice: Subject to any disclaimer, the term of this patent is extended or adjusted under 35 U.S.C. 154(b) by 0 days.

(21) Appl. No.: 10/292,726

(22) Filed: Nov. 12, 2002

(65) Prior Publication Data

US 2003/0096609 A1 May 22, 2003

Related U.S. Application Data

(60) Provisional application No. 60/337,809, filed on Nov. 13, 2001.

(51) Int. Cl.$^7$ .............................. G01S 5/02; H04B 7/185
(52) U.S. Cl. ..................... 701/226; 701/13; 342/357.12
(58) Field of Search ........................... 701/226, 13, 213; 342/357.02, 357.01, 357.12, 357.03; 455/12.1, 13.2, 427

(56) References Cited

U.S. PATENT DOCUMENTS

| 6,515,617 B1 | * | 2/2003 | Demers et al. ........ 342/357.01 |
| 6,567,712 B1 | * | 5/2003 | Rog et al. ..................... 700/56 |
| 6,570,530 B2 | * | 5/2003 | Gaal et al. ............. 342/357.02 |

* cited by examiner

*Primary Examiner*—Tan Q. Nguyen
(74) *Attorney, Agent, or Firm*—Roberts Abokhair & Mardula, LLC

(57) ABSTRACT

A method and apparatus for estimating the orbits of spacecraft or other objects relative to primary celestial bodies, given applicable measurements. The present invention uses the variation of parameters in universal variables for spacecraft trajectory propagation during operation of its optimal sequential orbit estimation. This method provides a universal capability for all three conics: elliptic, parabolic, and hyperbolic, forward-time and backward-time numerical integration for filtering and smoothing, respectively. A method for determining local and global estimates of atmospheric density is also provided. A method for realistic orbit simulation provides a means for validating an orbit estimate.

11 Claims, 3 Drawing Sheets

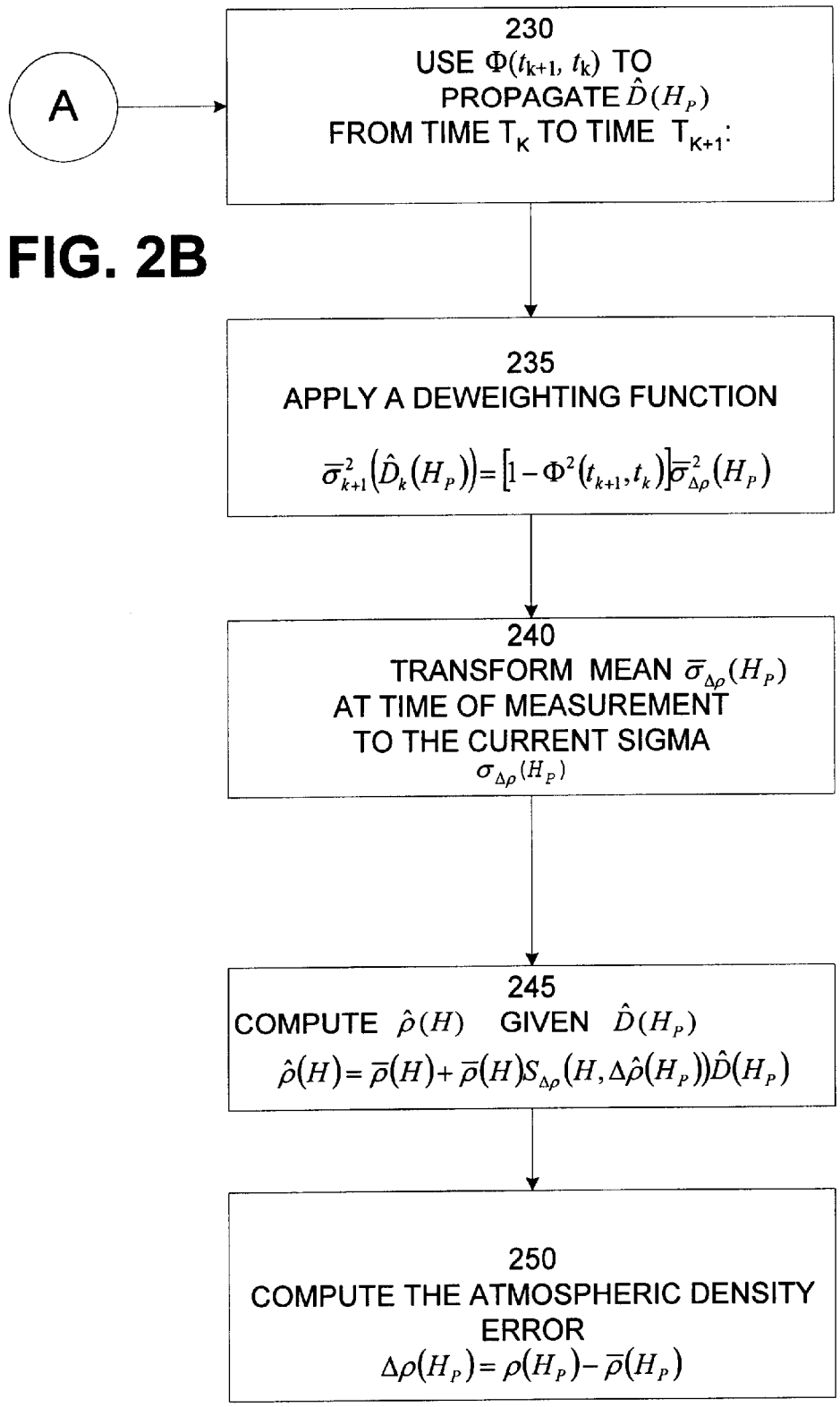

METHOD AND APPARATUS FOR ORBIT DETERMINATION

CROSS REFERENCE TO RELATED APPLICATIONS

This application claims priority under 35 U.S.C. § 119(e) from provisional application No. 60/337,809, filed Nov. 13, 2001. The 60/337,809 provisional application is incorporated by reference herein, in its entirety, for all purposes.

FIELD OF INVENTION

The present invention relates generally to the process of satellite orbit determination, that is, the estimation of orbits of spacecraft or other objects relative to primary celestial bodies, given applicable measurements. In particular, the invention relates to a highly refined orbit determination process comprising a novel synthesis of old and new methods useful in solving existing and new problems in orbit determination.

BACKGROUND OF THE INVENTION

Orbit determination refers to the estimation of orbits of spacecraft (or natural satellites or binary stars) relative to primary celestial bodies, given applicable measurements. All useful orbit determination methods produce orbit estimates, and all orbit estimates have errors. Minimizing these errors is desirable in all cases.

Orbit determination methods are distinguished with three categories according to their inputs, outputs, and accuracy performance:

(1) Initial orbit determination (IOD)
(2) Batch least squares differential corrections (LS)
(3) Sequential processing (SP)

Operationally, the order in which these methods are used defines a dependency tree: IOD output is LS input, and LS output is SP input:

IOD⇒LS⇒SP

For accuracy performance: IOD produces crude orbit estimates, LS produces refined orbit estimates in a batch processing mode, and SP produces refined orbit estimates in a sequential mode.

IOD methods input tracking measurements with tracking platform locations, and output spacecraft position and velocity estimates. No a priori orbit estimate is required. IOD methods are characterized by the use of approximations and/or recursive algorithms operating on nonlinear two-body dynamics. IOD methods were derived by various authors: LaPlace, Gauss, Lagrange, Lambert, Gibbs, Herrick, Williams, Stumpp, Lancaster, Blanchard, Gooding, and Smith. Operationally, the orbit determination process is frequently begun, or restarted, with IOD.

LS methods input tracking measurements with tracking platform locations and an a priori orbit estimate, and output a refined orbit estimate. An a priori orbit estimate is required. Associated output error magnitudes are small when compared to IOD outputs. LS methods use a sequence of linear LS corrections where sequence convergeance is defined as a function of tracking measurement residual RMS (Root Mean Square). Each linear LS correction is characterized by a minimization of the sum of squares of tracking measurement residuals. LS methods produce refined orbit estimates in a batch mode, together with error covariance matrices that are optimistic; i.e., orbit element error variances are typically too small by at least an order of magnitude. Operationally, LS may be the only method used, or it may be used to initialize SP. LS methods frequently require inspection and manual measurement editing by human intervention. LS algorithms therefore require elaborate software mechanisms for measurement editing. The LS method was derived first by Gauss in 1795, and later independently by Legendre. Gauss published in Latin, after Legendre. Gauss' English translation was first available in 1857.

SP methods input tracking measurements with tracking platform locations, input an a priori state estimate (inclusive of orbit estimate), and input an a priori state error covariance matrix. An a priori state estimate is required, and an a priori state error covariance matrix is required. SP methods output refined state estimates in a sequential mode. SP filter methods are forward-time recursive sequential machines using a repeating pattern of filter time update of the state estimate and filter measurement update of the state estimate. The filter time update propagates the state estimate forward, and the filter measurement update incorporates the next measurement. The recursive pattern includes an important interval of filter initialization. SP smoother methods are backward-time recursive sequential machines using a repeating pattern of state estimate refinement using filter outputs and backwards transition. Time transitions for both filter and smoother are dominated most significantly by numerical orbit propagators. The search for sequential processing was begun by Wiener, Kalman, Bucy, Meditch, and others.

In summary, IOD methods produce crude state estimates from measurements alone, whereas LS and SP methods produce refined corrections to a priori state estimates.

Current orbit determination methods suffer from a number of deficiencies. Current methods limit the number of spacecraft orbits in their simultaneous state estimate and are constrained to particular constellations of spacecraft orbits. Current methods require the user to specify the state estimate structure (and, in the case of sequential methods, an error covariance matrix), which burdens the user with a task he may not be qualified, or may not wish, to perform. Additionally, current methods lack the ability to estimate atmospheric density in real time using an SP method and fail to employ the variation of parameters in universal variables. Another deficiency of current methods is that they fail to provide a measurement simulator that employs the same stochastic sequence models as those used by the optimal sequential filter for time updates.

To overcome the shortcomings of prior approaches to orbit determination, a method and apparatus are needed that utilize stochastic sequence models and real-time data range and tracking data to produce accurate orbital estimates. Additionally, such method and apparatus would also use the range and tracking data in conjunction with near-time atmospheric density data to produce a real-time estimate of local atmospheric density and to correct orbit determinations from error relating to atmospheric drag.

Such a system of orbit determination would take advantage of object oriented programming in high order languages, such as C++, in particular the containers and methods made available in the Standard Template Library (STL).

SUMMARY OF THE INVENTION

An embodiment of the present invention is a method for estimating the orbits of a satellite or a constellation of satellites using stochastic sequence models and real-time data.

It is an aspect of the present invention to provide a method and apparatus that implements a system of orbit determination that enables the user to specify an arbitrary number of satellite orbits, of arbitrary types, to be included in the simultaneous state estimate structure.

It is a further aspect of the present invention to provide a method and apparatus that implements a system of orbit determination that includes an automatic definition algorithm of the state estimate structure for an orbit determination, given appropriate six-dimensional orbit definitions and other user inputs.

It is a further aspect of the present invention to provide a method and apparatus that implements a system of orbit determination that has the ability to estimate atmospheric density in real time, either on a local scale or a global scale, using a sequential processing method.

It is a further aspect of the present invention to provide a method and apparatus that implements a system of orbit determination that uses variation of parameters in universal variables for orbit propagation.

It is a further aspect of the present invention to provide a method and apparatus that implements a system of orbit determination that has a measurement simulator that employs the same stochastic sequence models used by the optimal sequential filter for time updates.

It is a further aspect of the present invention to provide a method and apparatus that implements a system of orbit determination using object oriented programming in a high order language, such as C++, making particular use of containers and methods provided by the Standard Template Library (STL).

These and other objectives of the present invention will become apparent from a review of the general and detailed descriptions that follow. An embodiment of the present invention is a method for estimating the orbits of a satellite or a constellation of satellites using physics, optimal estimation theory and algorithms derived therefrom, and tracking data—either real time, near real time, or archived.

BRIEF DESCRIPTION OF THE INVENTION

Figure 1:
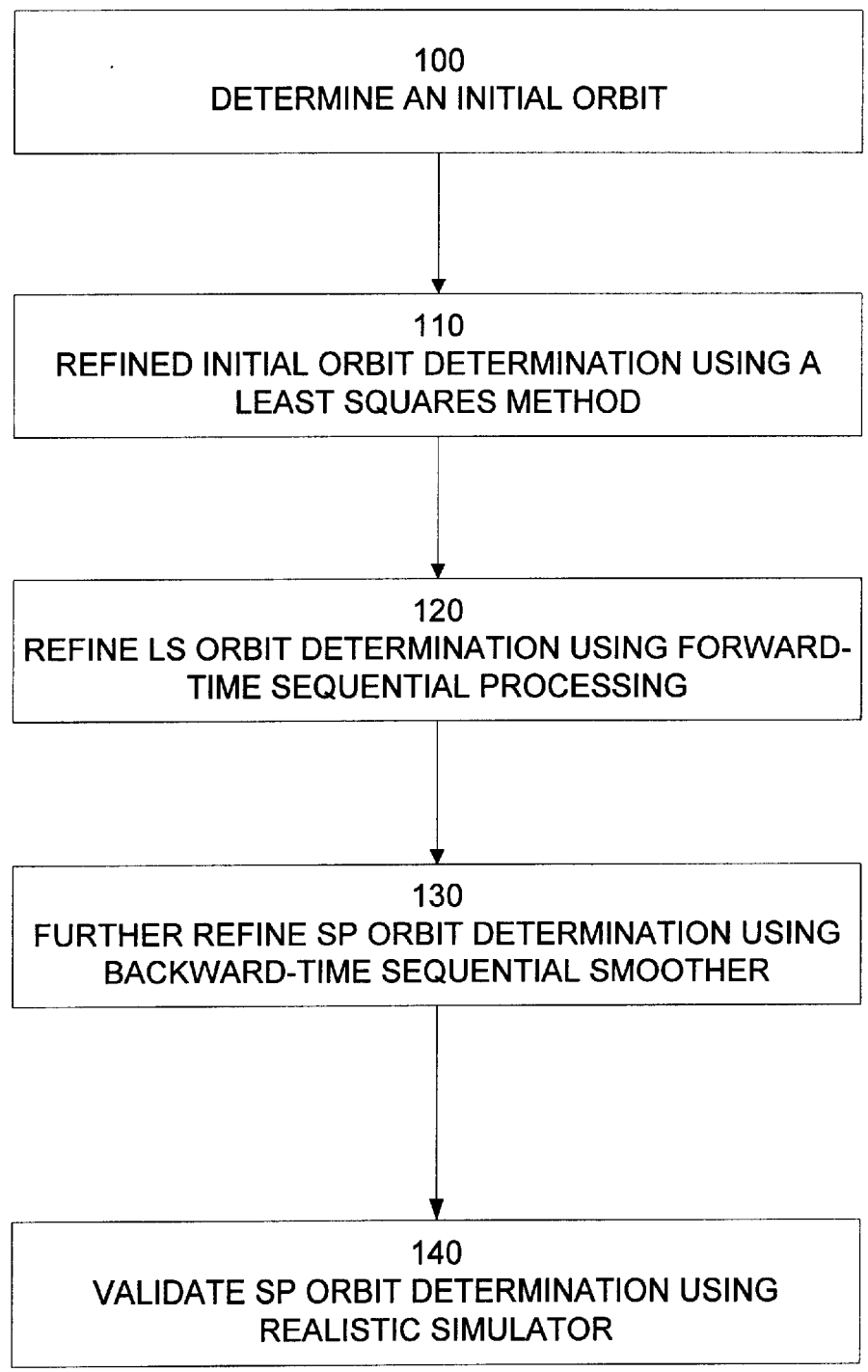
FIG. 1 illustrates a block diagram of an orbit determination process according to the present invention.

An embodiment of the present invention is a method for estimating the orbits of a satellite or a constellation of satellites using physics, optimal estimation theory and algorithms derived therefrom, and tracking data—either real time, near real time, or archived. Referring to FIG. 1, a block diagram of a process according to the present invention is illustrated. The process begins with a determination of an initial orbit 100. The initial orbit is refined using a least squares correction algorithm 110. Further refinement of the corrected initial orbit is accomplished using sequential processing. In this embodiment, sequential processing is performed by a forward-time sequential filter 120 and backward-time sequential smoother 130. A realistic tracking data simulator 140 is used to validate the orbit determination implementation, and to perform orbit determination analyses using simulated data.

Optimal orbit determination methods define the state estimate structure so that all effects observable from a given sequence of measurements are accounted for with appropriate state estimate parameters. For any low Earth orbit (LEO), the state estimate structure must thus contain some parameter to model and remove the effects of atmospheric drag on the spacecraft surfaces. Currently, without the present invention, this drag parameter, call it B, is defined as a cofactor, or subset of cofactors, from the air-drag ballistic acceleration equation:

$$\ddot{r}_{drag} = -2\left[\frac{C_D A}{M}\right]\rho \dot{s}_A^2 (\dot{R}_A)_U$$

where $\ddot{r}_{drag}$ is air-drag acceleration, $C_D$ is the unitless ballistic coefficient for free molecular flow, A is the cross-section area of the spacecraft projected onto a plane orthogonal to vector $\dot{R}_A$, M is spacecraft mass, $\rho$ is atmospheric density at spacecraft position and time, $\dot{R}_A$ is the velocity vector of the spacecraft relative to the vector basis associated with Earth's rotating atmosphere, $(\dot{R}_A)_U$ is the unit vector from $\dot{R}_A$, and $\dot{s}_A$ is the magnitude of $\dot{R}_A$.

In current models, B has been defined by $C_D$, or by $C_D A/M$, or by some other cofactor not containing the atmospheric density $\rho$.

Both LS and SP algorithms have been used for orbit determination for LEO spacecraft.

For LS algorithms the drag parameter B must be modeled as a time constant due to least squares algorithm limitations. However, this model has significant consequences to the overall orbital determination, first because the drag acceleration modeling error $\Delta \ddot{r}_{drag}$ has its dominant source in the atmospheric density error $\Delta\rho$, and $\Delta\rho$ has significant variations with height above the reference ellipsoid and also has extreme variations due to solar activity and associated geomagnetic activity. Thus $\Delta\rho$ has significant variations with time, and height changes rapidly with time (LEO speed is near 7.5 km/s). Also, $\Delta\rho$ has extreme and unpredictable variations with time during several years at each eleven year solar maximum due to unpredictable solar activity and associated geomagnetic activity. Further, the use of least squares prohibits real-time estimation of any air-drag parameter because a significant batch of spacecraft tracking data must be collected before the least squares orbit determination can be performed, and the best least squares estimate of the drag parameter B lies near the center of the batch least squares time span. In summary, LS algorithms are incapable of providing effective real-time estimates of atmospheric density.

Currently, without the present invention, the estimation of an air-drag parameter B using SP algorithms enables B to be modeled as a time variable, but there remains the problem that the dominant drag acceleration modeling error $\Delta \ddot{r}_{drag}$ has its source in the atmospheric density error $\Delta\rho$, not in $\Delta B$. Note that the $\Delta B$ model does not explicitly depend on spacecraft height, nor does it depend on solar activity and associated geomagnetic activity.

In an embodiment of the present invention, the forward-time sequential filter performs a sequential estimation of atmospheric density modeling error $\Delta\rho$ in real time as a state estimate parameter for the orbit determination of a spacecraft using an SP method. Physically correct air density modeling error expressions derive from variational operations on an appropriate atmospheric density model using the history, and dynamic measurements, of geomagnetic and solar indices (including, but not limited to, Kp and F10). These physically connected expressions generate particular auto-covariance functions for the filter that cannot be approximated with any past ad-hoc filtering technique.

Figure 2A:
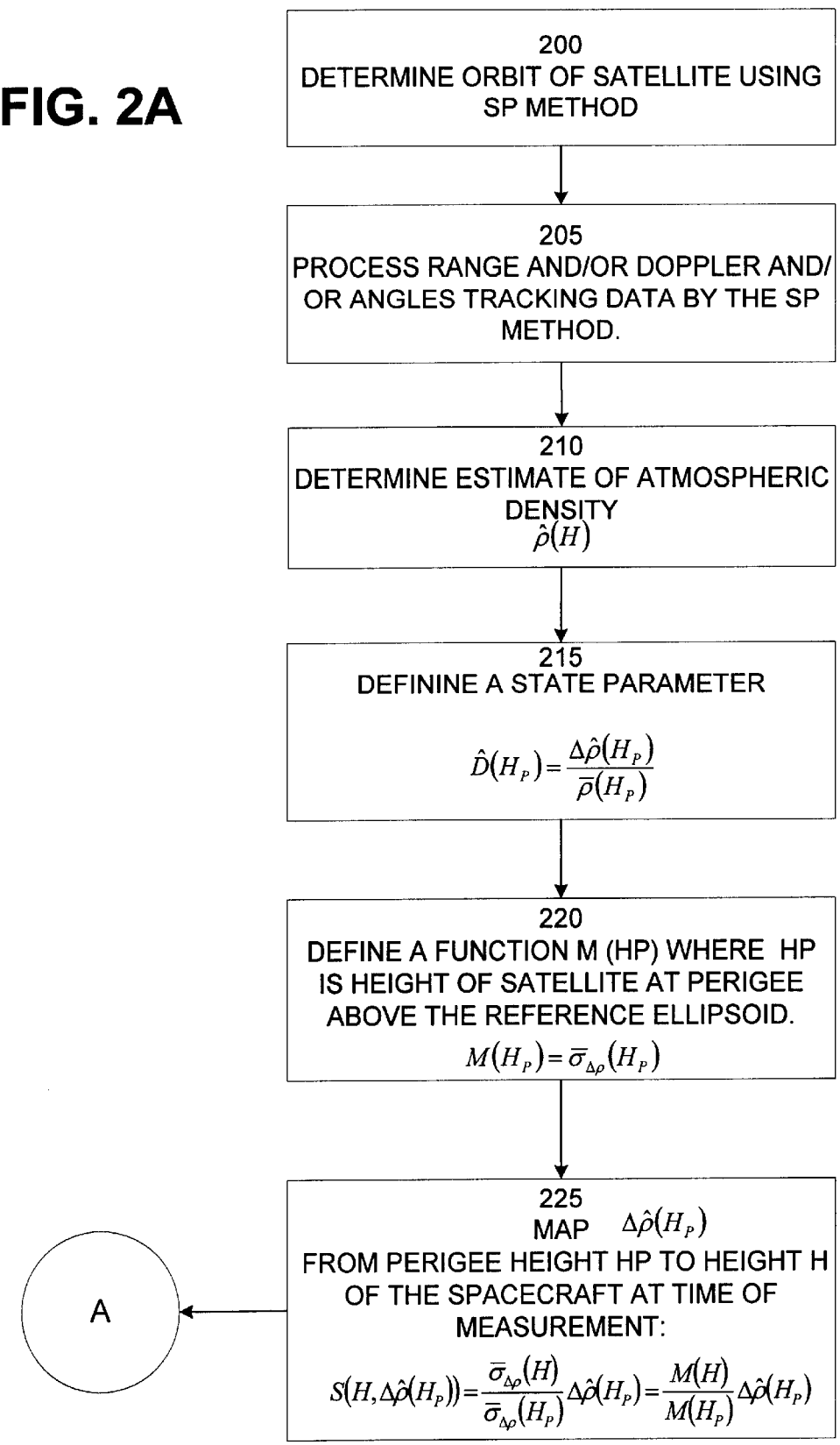
FIG. 2 a flow chart of a method of estimating atmospheric density modeling error $\Delta\rho$ in real time according to an embodiment of the present invention is illustrated.

Referring to FIG. 2, a flow chart of a method of estimating atmospheric density modeling error $\Delta\rho$ in real time according to an embodiment of the present invention is illustrated. The SP method makes use of a sequential filter to process the tracking data sequentially with time. The sequential filter employs two functions recursively: the filter time update and the filter measurement update. The filter time update moves the state estimate and error covariance from time of a given measurement to time of the next given measurement and increases the covariance appropriately across this time interval. The filter measurement update incorporates the information provided by the tracking data measurement at measurement time into the state estimate and reduces the covariance appropriately.

In this embodiment, the real-time estimation of atmospheric density modeling error $\Delta\rho$ embodied herein comprises ten elements and a process by which they are combined:

(1) A sequential processing (SP) method for orbit determination of a low-earth orbit (LEO) spacecraft 200.

(2) Range and/or Doppler tracking data to be processed by the SP method 205.

(3) An appropriate atmospheric density model (ADM) 210 that derives atmospheric density $\overline{\rho}$, in part, from current observatory measured solar and geomagnetic indices $\alpha_1$, $i \in \{1, 2, 3, \ldots\}$; e.g., the ten centimeter solar flux measurement $\alpha_1 = F_{10}$, its mean across several months $\alpha_2 = \overline{F}_{10}$, and the three-hourly geomagnetic measurement $\alpha_3 = K_P$ or $\alpha_4 = a_P$.

(4) A state estimate parameter $\hat{D}(H_P)$ definition 215:

$$\hat{D}(H_P) = \frac{\Delta\hat{\rho}(H_P)}{\overline{\rho}(H_P)}$$

(5) A function $M(H_P)$ 220 that is dependent on height $H_P$ of spacecraft at perigee above the reference ellipsoid, the ADM, and the recorded history of $F_{10}$ and $K_P$, to define the square root, $M(H_P) = \overline{\sigma}_{\Delta\rho}(H_P)$, of mean atmospheric density error variance across multiple eleven year solar cycles.

(6) The function $S_{\Delta\rho}(H, \Delta\hat{\rho}(H_P)) = \Delta\hat{\rho}(H)$ to map $\Delta\hat{\rho}(H_P)$ from perigee height $H_P$ to height $H$ of the spacecraft at time of measurement 225:

$$S(H, \Delta\hat{\rho}(H_P)) = \frac{\overline{\sigma}_{\Delta\rho}(H)}{\overline{\sigma}_{\Delta\rho}(H_P)} \Delta\hat{\rho}(H_P) = \frac{M(H)}{M(H_P)} \Delta\hat{\rho}(H_P)$$

(7) A Gauss-Markov transition function $\Phi(t_{k+1}, t_k)$ to propagate $\hat{D}(H_P)$ from time $t_k$ to time $t_{k+1}$ 230:

$$\hat{D}_{k+1}(H_P) = \Phi(t_{k+1}, t_k)\hat{D}_k(H_P)$$

where $$((t_{k+1} - t_k) \to 0) \Rightarrow (\Phi(t_{k+1}, t_k) \to 1)$$

and $$((t_{k+1} - t_k) \to \infty) \Rightarrow (\Phi(t_{k+1}, t_k) \to 0)$$

(8) A Gauss-Markov deweighting function for variance on the filter time update 235:

$$\overline{\sigma}_{k+1}^2(\hat{D}_k(H_P)) = [1 - \Phi^2(t_{k+1}, t_k)]\overline{\sigma}_{\Delta\rho}^2(H_P)$$

where $\overline{\sigma}_{\Delta\rho}^2(H_P)$ is a positive time constant.

(9) The function $T(\overline{\sigma}_{\Delta\rho}(H_P), \alpha_i) = \sigma_{\Delta\rho}(H_P)$ to transform the mean sigma $\overline{\sigma}_{\Delta\rho}(H_P)$ at time of measurement to the current sigma $\sigma_{\Delta\rho}(H_P)$ 240 due to influence of most recently observed values of $\alpha_i$, $i \in \{1, 2, 3, \ldots\}$, the observed index values of solar activity and geomagnetic activity. T is defined as follows:

$$T(\overline{\sigma}_{\Delta\rho}(H_P), \alpha_i) = \left[\frac{\overline{\rho}(\alpha_i)}{\overline{\rho}(\overline{\alpha}_i)}\right]\overline{\sigma}_{\Delta\rho}(H_P)$$

where, given the current-time and filter state estimate, the ADM is used to calculate atmospheric density $\overline{\rho}(\overline{\alpha}_i)$ for mean values $\overline{\alpha}_i$ of $\alpha_i$ associated with $\overline{\sigma}_{\Delta\rho}(H_P)$, and to calculate atmospheric density $\overline{\rho}(\alpha_i)$ for the current-time values $\alpha_i$.

(10) Computation of $\hat{\rho}(H)$ given $\hat{D}(H_P)$ 245:

$$\hat{\rho}(H) = \overline{\rho}(H)[1 + S_{\Delta\rho}(H, \Delta\hat{\rho}(H_P))\hat{D}(H_P)]$$

or, with the state estimate parameter definition in (4) inserted into the above for transparency:

$$\hat{\rho}(H) = \overline{\rho}(H) + \overline{\rho}(H)S_{\Delta\rho}(H, \Delta\hat{\rho}(H_P))\hat{D}(H_P)$$

In an embodiment of the present invention, the foregoing elements are combined in a process that can be summarized as follows. The estimate of relative density correction at the perigee height, $\hat{D}(H_P)$, is propagated through time between measurements using the Gauss-Markov transition function as shown in element (7), above. The estimate of the correction to atmospheric density at the perigee height, $\Delta\rho(H_P)$, is then computed by inverting the expression given in element (4). This correction and the current height are then used to compute the value of the mapping function, $S_{\Delta\rho}$, which is multiplied by the density correction at perigee height to yield the estimate of the density correction at the current height, $\Delta\hat{\rho}(H)$ as shown in element (10). The density correction estimate is added to the density computed by the ADM, $\overline{\rho}(H)$, to yield the estimate of density $\hat{\rho}(H)$. This estimate of density is used in the computation of the acceleration due to atmospheric drag during satellite trajectory propagation. The deweighting of the variance of estimate of $\hat{D}(H_P)$ is performed as shown in elements (8) and (9).

Estimates $\Delta\hat{\rho}(H_P)$ of the ADM error $\Delta\rho(H_P) = \rho(H_P) - \overline{\rho}(H_P)$ 250 derive from information provided in the real time range and/or Doppler tracking data. Real time estimates of $\Delta\hat{\rho}(H_P)$ are enabled by the SP method used for estimation of the state, where the state structure contains six elements of spacecraft position and velocity, relative atmospheric density modeling error $\hat{D}(H_P)$, and other parameters.

When solar activity and geomagnetic activity are negligible, the relative change from $\overline{\sigma}_{\Delta\rho}(H_P)$ to $\sigma_{\Delta\rho}(H_P)$ is small or negligible. But when solar activity and geomagnetic activity are significant, and when this activity is sensed by $\alpha_i$, then the relative increasing change from $\overline{\sigma}_{\Delta\rho}(H_P)$ to $\sigma_{\Delta\rho}(H_P)$ is significant. In fact, following a solar coronal mass ejection (CME) that impacts the Earth, this relative change can be several hundred percent. In an embodiment of the present invention, when $\sigma_{\Delta\rho}(H_P)$ is large, the filter gain is opened to appropriately enable large corrections $\Delta\hat{\rho}$ to the ADM.

In another embodiment of the present invention, a global near real time atmospheric density model is determined. In this embodiment, the local estimate of density $\hat{\rho}(H)$ is determined with respect to multiple satellites over a distribution of orbits. The local estimates of density are then mapped in real-time over the spherical model of the atmosphere. In one embodiment, the data to determine the density on a global scale are obtained from existing satellites. In another embodiment, a constellation of satellites is deployed to achieve the desired model integrity. In still another embodiment of the present invention, the density values derived from global density model are used as initial estimates of density in times of quiet solar activity.

It is important to note that the observed values of $\alpha_i$ are imperfect in both timing and size. For example, values of $K_P$ are provided as time constants across three-hour time intervals. For nominal benign behavior of geomagnetic activity the discontinuities at three-hour epochs are smoothly absorbed. But following extreme solar activity and geomagnetic activity, the discontinuities at three-hour epochs generate very significant discontinuities in the atmospheric density estimate $\bar{\rho}$ provided by the ADM. Geomagnetic activity is not constant across any time interval and certainly does not have a discontinuity at each three-hour epoch. Also the $\alpha_i$ measurements necessarily always lag real-time because when used by the real-time filter they are observations from the past. Real-time range and/or Doppler tracking data do sense the change in atmospheric density due to solar and geomagnetic activity as it is experienced. Consequently, following extreme solar activity and geomagnetic activity, the filter estimate $\Delta\hat{\rho}(H_P)$ corrects for changes in atmospheric density not explicitly defined by the $\alpha_i$, due to these timing and size problems with the $\alpha_i$.

There are two keys to the method of air density estimation described above: the process by which the ten elements defined above are combined; and the new and powerful function $T(\bar{\sigma}_{\Delta\rho}(H_P), \alpha_i) = \sigma_{\Delta\rho}(H_P)$ that transforms the mean sigma $\bar{\sigma}_{\Delta\rho}(H_P)$ to the current-time sigma $\sigma_{\Delta\rho}(H_P)$ due to influence of most recently observed values of $\alpha_i$, $i \in \{1, 2, 3, \ldots\}$.

Referring again to FIG. 1, a tracking simulator 140 is illustrated as part of the process flow. As previously noted, a tracking data simulator has two principal uses: to validate an orbit determination capability during development and maintenance, and to perform orbit determination analyses using simulated data. A realistic tracking data simulator is required for orbit determination validation.

In another embodiment of the present invention, a realistic simulator is provided. To understand the realistic simulator of the present invention, it is useful to distinguish between realistic and rudimentary tracking data simulators. In a rudimentary estimator, initial orbit conditions are obtained according to orbit class for which an orbit determination capability is designed. From these initial conditions a simulated truth orbit is defined, and an ensemble of simulated initial orbit estimates is defined. Alternatively, an initial simulated orbit estimate is defined and an ensemble of simulated truth orbits is defined. The latter case is most convenient. It makes no difference functionally which method is used. In either case, the orbit difference between orbit truth and orbit estimate defines initial orbit error.

A truth trajectory is numerically integrated from the true orbit initial condition. Stage-one simulated measurements are calculated directly from the truth trajectory according to measurement definitions, but with no random error processes simulated. Zero-mean Gaussian white noise sequences are added to the stage-one simulated measurements to define stage-two simulated measurements. An initial approximate orbit estimate is used to initialize the orbit determination capability.

The white noise sequences added to the stage-one simulated measurements are designed to simulate the random thermal noise due to the radio-signal receiver used for range and Doppler measurements, and for random errors in angles measurements. The simulated orbit error in initial conditions is designed to represent realistic error in orbit estimate initial conditions.

When stage-one measurements are processed by the orbit determination capability using an initial approximate orbit estimate, the simulated truth orbit is recovered, except for numerical computer word errors of truncation. When stage-two measurements are processed by the orbit determination capability, the simulated truth orbit is recovered, except for non-mean measurement white noise error due to limited sample size, and those due to numerical computer word errors of truncation. This enables a rudimentary form of validation for the orbit determination capability.

The computer program used to calculate the simulated measurements, and the orbit error, is the simulator. The foregoing paragraphs define a simulator that is rudimentary, representing the current state of the art without the present invention.

In an embodiment of the present invention, a realistic simulator is implemented, the realistic simulator having the aforementioned attributes of a rudimentary simulator and comprising additional physically-connected stochastic capabilities, including, by way of example and not as a limitation:

Serially correlated transponder biases for two-way measurements;

Serially correlated measurement biases for two-way measurements;

Serially correlated clock biases for one-way measurements; and

Serially correlated force model error biases for all orbits.

The stochastic processes used to model realistic estimation errors for the state error covariance function in the sequential estimator are also used for simulation. This is accomplished by embedding both the sequential state error covariance time update and the sequential simulation state error time update in the same filter time update function used for both.

As previously described, SP methods input tracking measurements with tracking platform locations, input an a priori state estimate (inclusive of orbit estimate), and input an a priori state error covariance matrix. An a priori state estimate is required, and an a priori state error covariance matrix is required. SP methods output refined state estimates in a sequential mode. SP filter methods are forward-time recursive sequential machines using a repeating pattern of filter time update of the state estimate and filter measurement update of the state estimate. The filter time update propagates the state estimate forward, and the filter measurement update incorporates the next measurement. The recursive pattern includes an important interval of filter initialization.

The state estimate structure is a list (column matrix) of all parameters that are unknown and observable to a particular measurement set. A state estimate element is observable to a given measurement if the use of that measurement reduces the error variance on that state estimate element. Currently, without the present invention, the orbit analyst is faced with the task of defining this structure. Not all analysts have the requisite skills or knowledge to define the state estimate structure, and even those who have that capability may prefer not to be burdened with this task.

In another embodiment of the present invention, a process for automatically defining a state estimate structure uses an automatic definition algorithm that accepts user input.

In this embodiment, the state estimate structure is initialized with three components of position, three components of velocity, and an associated epoch, all derived from user input. The user may enter the position and velocity components directly, or may enter Kepler orbit elements from which position and velocity are transformed.

From orbit definition the algorithm calculates perigee and apogee heights above the reference ellipsoid. Algorithm default values for air drag maximum perigee height, and solar pressure minimum apogee height are used as follows. If perigee height is smaller than the air drag maximum perigee height, then the air density parameter is automatically added to the state estimate structure. If apogee height is larger than solar pressure minimum apogee height, then the solar pressure parameter is automatically added to the state estimate structure. The default values for air drag maximum perigee height and solar pressure minimum apogee height may be reset by the user.

With a spacecraft transponder and two-way range measurements, a Gauss-Markov transponder bias is automatically added to the state if there is more than one ground station producing range data. Note that for only one ground station the transponder bias is perfectly correlated with ground station range bias; i.e., transponder bias should not be estimated.

Measurement related parameters are added to the state as a function of measurement type. For two-way range and/or Doppler measurements, Gauss-Markov ground station measurement biases are automatically added to the state. For one-way range and/or Doppler measurements (e.g., GPS), appropriate phase and frequency clock parameters are automatically added to the state. These comprise:

Random walk in phase due to white noise in frequency; and

Random walk in frequency due to random walk in frequency, and integral random walk in phase due to random walk in frequency.

Random walk and integral random walk stochastic sequences are observable, whereas white noise sequences are not observable.

The user may override any state parameter that is automatically set.

In contrast to prior art systems that model force model errors and measurement model errors with trivial white noise processes, the present invention employs the same physically connected processes for the simulator sequential time update as used in the sequential filter time update.

Other ways in which the present invention overcomes the noted deficiencies of prior art systems of orbit determination include giving the user the capacity to include an arbitrary number of spacecraft orbits of any orbit class, dependent only on available computer memory.

The present invention uses the variation of parameters in universal variables for spacecraft trajectory propagation during operation of its optimal sequential orbit estimation. This method provides:

The best trajectory accuracy per given time-step on any non-uniform measurement time grid;

A universal capability for all three conics: elliptic, parabolic, and hyperbolic;

Forward-time and backward-time numerical integration for filtering and smoothing, respectively;

A rigorous first-order single step numerical method;

Numerical integration in inertial position and velocity components; and

Regularization for high-eccentricity orbits while maintaining time as an independent variable.

The implementation of the present invention also make use of the Standard Template Library, which enables run-time decisions by the user with considerable flexibility and a high degree of run-time stability.

A method and apparatus for orbit determination has now been illustrated. As described herein, embodiments of the present invention permit a user to define and specify an arbitrary number of spacecraft orbits at computer run-time for inclusion in a simultaneous state estimate. Given the specification of spacecraft orbits by the user, the orbit determination program automatically constructs the complete state estimate for the user, inclusive of appropriate time varying force model parameters, measurement bias parameters, and transponder bias parameters. During execution for low earth orbit (LEO), the SP method of the present invention appropriately estimates time varying atmospheric density corrections, rather than an inappropriate scaling parameter, to absorb atmospheric density modeling errors. The orbit determination program provides a realistic measurement simulator that employs the same stochastic sequence models used in the orbit determination sequential filter. It will be understood by those skilled in the art of the present invention that the present invention may be embodied in other specific forms without departing from the scope of the present invention and that the examples and embodiments described herein are in all respects illustrative and not restrictive. Those skilled in the art of the present invention will recognize that other embodiments using the concepts described herein are also possible.

What is claimed is:

1. A method of estimating in real-time an orbit of a satellite using a recursive filter and wherein the recursive filter first receives an a priori state estimate and an a priori state error covariance matrix for the satellite, and wherein the method comprises:

inputting tracking measurements for the satellite received in real-time from tracking stations to the recursive filter at filter time update "T";

inputting filter tracking station platform data to the recursive at filter time update "T";

computing recursively the current state estimate, the current error covariance and the current filter measurement update of the satellite at filter time update "T";

moving the state estimate and error covariance from filter time update "T" to filter time update "T+1";

incorporating into the filter measurement update the information provided by the tracking data measurement at filter time update T; and determining a current estimate of the orbit of the satellite.

2. The method of claim 1 further comprising determining an estimate of density $\hat{\rho}(H)$ in real-time for use in the computation of the acceleration of the satellite due to atmospheric drag during satellite trajectory propagation, wherein the satellite has a current height "H", and wherein the determination of the estimate of density $\hat{\rho}(H)$ comprises:

computing from an atmospheric density model (ADM) atmospheric density $\bar{\rho}$ at height H ($\bar{\rho}(H)$), wherein the ADM derives $\bar{\rho}(H)$ in part from current observatory measured solar and geomagnetic indices;

propagating through time an estimate of the relative density correction at the perigee height $\hat{D}(H_P)$ of the satellite, wherein $H_P$ is the satellite height at perigee and $$\hat{D}(H_P) = \frac{\Delta\hat{\rho}(H_P)}{\bar{\rho}(H_P)};$$

deweighting the variance estimate of $\hat{D}(H_P)$;

computing an estimate of the correction to atmospheric density at a perigee height, $\Delta\hat{\rho}(H_P)$;

computing from $\Delta\hat{\rho}(H_P)$ and the current height of the satellite "H" the value of a mapping function, $S_{\Delta\rho}$;

computing an estimate of the density correction at the current height, $\Delta\hat{\rho}(H)$, by multiplying $S_{\Delta\rho}$ by $\hat{D}(H_P)$; and adding the density correction estimate $\Delta\hat{\rho}(H)$ to $\bar{\rho}(H)$ to determine $\hat{\rho}(H)$.

3. The method of claim 2, wherein propagating through time an estimate of the relative density correction at the perigee height $\hat{D}(H_P)$ of the satellite, wherein $H_P$ is the satellite height at perigee and $$\hat{D}(H_P) = \frac{\Delta\hat{\rho}(H_P)}{\bar{\rho}(H_P)}$$

comprises applying a Gauss-Markov transition function $\Phi(t_{k+1}, t_k)$ to propagate $\hat{D}(H_P)$ from time $t_k$ to time $t_{k+1}$ where:

$\hat{D}_{k+1}(H_P) = \Phi(t_{k+1}, t_k)\hat{D}_k(H_P)$;
$((t_{k+1}-t_k)\to 0) \Rightarrow (\Phi(t_{k+1}, t_k)\to 1)$ and $((t_{k+1}-t_k)\to\infty) \Rightarrow (\Phi(t_{k+1}, t_k)\to 0)$.

4. The method of claim 2, wherein deweighting the variance estimate of $\hat{D}(H_P)$ comprises applying a Gauss-Markov deweighting function for variance on the filter time update where:

$\bar{\sigma}_{k+1}^2(\hat{D}_k(H_P)) = \lfloor 1-\Phi^2(t_{k+1}, t_k)\rfloor\bar{\sigma}_{\Delta\rho}^2(H_P)$ where $\sigma_{\Delta\rho}^2(H_P)$ is a positive time constant.

5. The method of claim 2, wherein the current observatory measured solar and geomagnetic indices comprises the ten centimeter solar flux measurement $F_{10}$, its mean across several months $\bar{F}_{10}$, and a geomagnetic measurement.

6. The method of claim 5 wherein geomagnetic measurement is selected from the group consisting of the three-hourly geomagnetic measurement $K_P$ and $a_P$.

7. The method of claim 6 wherein the recursive filter gain is determined, in part, by the value of $K_P$.

8. The method of claim 6 wherein the recursive filter gain is determined, in part, by the value of $a_P$.

9. The method of claim 1 further comprising validating an orbit determination using simulated data wherein the simulated data is generated by;

obtaining a priori state of the satellite;

computing an initial simulated orbit estimate and a simulated truth orbit;

determining the initial orbit error by computing the difference between simulated truth orbit and the simulated orbit estimate; and adjusting the initial orbit error using error estimates reflected in the state error covariance matrix.

10. The method of claim 9 wherein the error estimates reflected in the state error covariance matrix are selected from the group consisting of serially correlated transponder biases for two-way measurements, serially correlated measurement biases for two-way measurements, serially correlated clock biases for one-way measurements; and serially correlated force model error biases for all orbits.

11. The method of claim 1 wherein computing recursively at filter time update "T" the current state estimate, the current error covariance and the current filter measurement update of the satellite, moving the state estimate and error covariance from filter time update "T" to filter time update "T+1", incorporating into the filter measurement update the information provided by the tracking data measurement at filter time update T, and arriving at a current estimate of the orbit of the satellite are performed in an object-oriented computer program.

* * * * *